United States Patent
Nagayama et al.

(10) Patent No.: US 9,728,815 B2
(45) Date of Patent: Aug. 8, 2017

(54) ASSEMBLED BATTERY

(71) Applicant: NISSAN MOTOR CO., LTD., Kanagawa (JP)

(72) Inventors: Mori Nagayama, Yokohama (JP); Atsushi Miyazawa, Kamakura (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 239 days.

(21) Appl. No.: 14/383,281

(22) PCT Filed: Mar. 5, 2013

(86) PCT No.: PCT/JP2013/055904
§ 371 (c)(1),
(2) Date: Sep. 5, 2014

(87) PCT Pub. No.: WO2013/133239
PCT Pub. Date: Sep. 12, 2013

(65) Prior Publication Data
US 2015/0024288 A1    Jan. 22, 2015

(30) Foreign Application Priority Data

Mar. 8, 2012   (JP) ................................ 2012-051670
Feb. 28, 2013  (JP) ................................ 2013-039171

(51) Int. Cl.
| | | |
|---|---|---|
| H01M 10/42 | (2006.01) | |
| H01M 2/36 | (2006.01) | |
| H01M 12/02 | (2006.01) | |
| H01M 12/06 | (2006.01) | |
| H01M 8/04276 | (2016.01) | |
| H01M 12/08 | (2006.01) | |
| H01M 6/32 | (2006.01) | |

(52) U.S. Cl.
CPC ....... *H01M 10/4214* (2013.01); *H01M 2/362* (2013.01); *H01M 8/04283* (2013.01); *H01M 10/4207* (2013.01); *H01M 12/02* (2013.01); *H01M 12/065* (2013.01); *H01M 12/08* (2013.01); *H01M 6/32* (2013.01)

(58) Field of Classification Search
None
See application file for complete search history.

(56) References Cited

FOREIGN PATENT DOCUMENTS

| | | | | |
|---|---|---|---|---|
| GB | 1367673 A | * | 9/1974 | .............. H01M 2/40 |
| JP | 59-29330 U | | 8/1984 | |

* cited by examiner

*Primary Examiner* — Patrick Ryan
*Assistant Examiner* — Haixia Zhang
(74) *Attorney, Agent, or Firm* — Young Basile Hanlon & MacFarlane, P.C.

(57) ABSTRACT

An assembled battery includes a plurality of air cells arranged in a horizontal direction and a plurality of connection flow paths. Each air cell includes a storage portion between a positive electrode and a metal negative electrode to store an electrolysis solution. The storage portions of the respective adjacent air cells communicate with each other by the respective connection flow paths. An insulation fluid for electrically insulating the electrolysis solution in the respective adjacent air cells is sealed in the respective connection flow paths.

14 Claims, 7 Drawing Sheets

ASSEMBLED BATTERY

CROSS REFERENCE TO RELATED APPLICATIONS

The present application claims priority to Japanese Patent Applications Nos. 2012-051670 filed on Mar. 8, 2012, and 2013-039171, filed on Feb. 28, 2013, each incorporated herein in its entirety.

TECHNICAL FIELD

The present invention relates to an assembled battery including a plurality of air cells aligned therein using oxygen as a positive electrode active material.

BACKGROUND

There are known air cells including, for example, an injection-type air-zinc cell described in Japanese Examined Utility Model Application Publication No. 59-029330. The air cell described in Japanese Examined Utility Model Application Publication No. 59-029330 includes a cell casing including two air electrodes attached to both side surfaces thereof facing each other, the cell casing being divided, by a partition plate, into two spaces in which zinc electrodes are inserted. The partition plate is provided with recesses on both surfaces filled with fused alkali fixed thereto. Accordingly, a pair of cells is formed in the cell casing. Once water is injected into the cell casing, the alkali-fixed plate is fused to produce an alkali electrolysis solution having a predetermined concentration and thereby start power generation.

SUMMARY

However, since the conventional air cell is provided with a pair of cells formed in one cell casing, there is a risk of a short circuit (liquid junction) of the paired cells via the alkali electrolysis solution after the injection of the water.

In recent years, research and development of air cells used for main power supplies or auxiliary power supplies in moving bodies such as automobiles are being carried out. When an air cell is used for a main power supply or an auxiliary power supply in a moving body, a large number of air cells are required so as to be assembled to form an assembled battery. Accordingly, it is considerably important to prevent a short circuit caused as described above.

The present invention has been made in view of the above-described conventional problem. An object of the present invention is to provide an assembled battery including a plurality of air cells aligned therein capable of preventing a short circuit due to an electrolysis solution in the respective adjacent air cells.

An assembled battery according to an aspect of the present invention includes: two or more air cells arranged in a horizontal direction, each air cell including a storage portion between a positive electrode and a metal negative electrode to store an electrolysis solution; and a connection flow path member including one or more connection flow paths by which the storage portions of the respective adjacent air cells communicate with each other, wherein an insulation fluid for electrically insulating the electrolysis solution in the respective adjacent air cells is sealed in the connection flow path member.

DESCRIPTION OF EMBODIMENTS

First Embodiment

Figure 1:
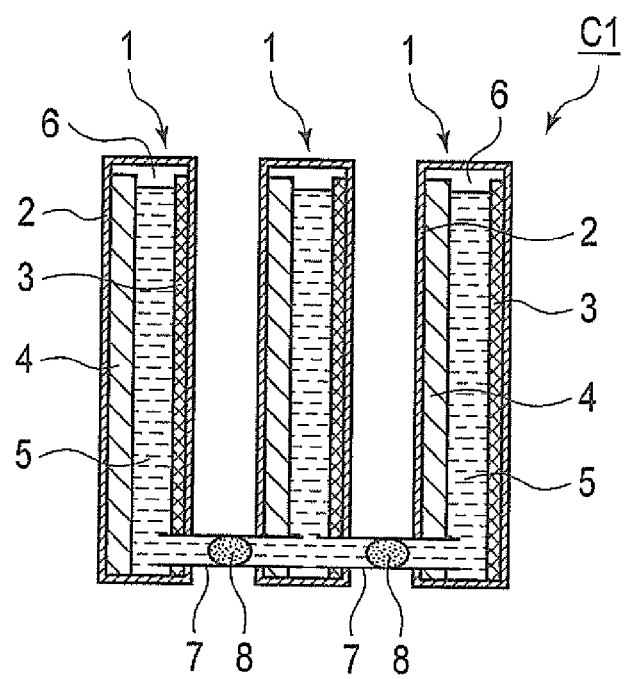
FIG. 1 is a cross-sectional view for explaining a configuration of an assembled battery according to a first embodiment of the present invention.

FIG. 1 is a cross-sectional view for explaining a configuration of an assembled battery C1 according to a first embodiment. The assembled battery C1 shown in FIG. 1 includes a plurality of (three in the present embodiment) air cells 1 arranged in a horizontal direction. Each of the air cells 1 includes a positive electrode (an air electrode) 3 and a metal negative electrode 4 housed in a flat casing 2, and includes a storage portion 6 between the positive electrode 3 and the metal negative electrode 4 to store an electrolysis solution 5. In the assembled battery C1, the plural air cells 1 adjacent to each other in a standing state are connected in series via connection flow paths 7.

The assembled battery C1 includes the plural connection flow paths 7 by which the storage portions 6 in the respective adjacent air cells 1 communicate with each other. In the present embodiment, each connection flow path 7 is located between bottom portions of the air cells 1 adjacent to each other in a standing state. Therefore, the storage portions 6 of the respective adjacent air cells 1 sequentially communicate with each other by the respective connection flow paths 7 below the liquid surface of the electrolysis solution 5 in each air cell 1. The connection flow paths 7 each include an insulation fluid 8 sealed therein for electrically insulating the electrolysis solution 5 stored in the respective adjacent air cells 1.

The positive electrode 3 in each air cell 1 includes a positive electrode member and a liquid-tight air-permeable member placed on the outermost layer side of the casing 2. The positive electrode member includes, for example, a catalyst component and an electric conductive catalyst carrier on which the catalyst component is supported.

In particular, the catalyst component is metal selected as appropriate from platinum (Pt), ruthenium (Ru), iridium (Ir), rhodium (Rh), palladium (Pd), osmium (Os), tungsten (W), lead (Pb), iron (Fe), chromium (Cr), cobalt (Co), nickel (Ni), manganese (Mg), vanadium (V), molybdenum (Mo), gallium (Ga), and aluminum (Al), or an alloy of these metals arbitrarily combined together. The shape and size of the catalyst component are not particularly limited, and any shape and size similar to those used in conventionally-known catalyst components may be used. However, the catalyst component is preferably in a particle state. An average particle diameter of catalyst particles is preferably in a range from 1 nm to 30 nm. When the average particle diameter of the catalyst particles is within the range from 1 nm to 30 nm, a balance of a catalyst utilization rate regarding an effective electrode area in which an electrochemical reaction progresses and ease of support of the catalyst component, can be controlled as appropriate.

The catalyst carrier functions as a carrier for supporting the catalyst component as described above and as an electron conducting path involved in electron communication between the catalyst component and other substances. The catalyst carrier is not particularly limited as long as it has a specific surface area sufficient to support the catalyst component in a desired dispersed state and has a sufficient electron conductive property, and preferably contains carbon as a main component. A specific example of the catalyst carrier may be carbon particles containing carbon black, activated carbon, coke, natural graphite or artificial graphite. The size of the catalyst carrier is not particularly limited; however, an average particle diameter of the catalyst carrier may be approximately in a range from 5 nm to 200 nm, preferably approximately in a range from 10 nm to 100 nm, in view of ease of support, the catalyst utilization rate, the thickness of the catalyst layer set within an appropriate range, and the like.

The supported amount of the catalyst component in the positive electrode member is preferably in a range from 10% to 80% by mass, more preferably in a range from 30% to 70% by mass, with respect to the total amount of the positive electrode member. However, the positive electrode member is not limited thereto, and conventionally-known materials applied to air cells may be used.

The liquid-tight air-permeable member has a liquid-tight (watertight) property with respect to the electrolysis solution 5 and has air permeability with respect to oxygen. The liquid-tight air-permeable member includes a water-repellent film such as polyolefin or fluorine resin in order to prevent the electrolysis solution 5 from leaking out and also has a large number of fine pores in order to supply oxygen to the positive electrode member.

The metal negative electrode 4 includes a negative electrode active material containing a single substance of metal or an alloy having a standard electrode potential which is less noble than that of hydrogen. Examples of the single substance of metal having a standard electrode potential less noble than that of hydrogen, include zinc (Zn), iron (Fe), aluminum (Al), magnesium (Mg), manganese (Mn), silicon (Si), titanium (Ti), chromium (Cr), and vanadium (V). The alloy may be obtained in such a manner as to add, to the metal element as listed above, one or more kinds of metal elements or non-metal elements. However, the material is not limited thereto, and conventionally-known materials applied to air cells may be used.

Although the metal negative electrode 4 is not limited to the substances described above, aluminum (Al) may be exemplified as a substance having high energy density. The use of such a material can achieve a reduction in thickness of the metal negative electrode 4 and thus the entire air cell 1, which decreases arrangement pitches when the plural air cells 1 are stacked to form an assembled battery and thereby contributes to an increase in capacity or a reduction in weight in the assembled battery.

An example of the electrolysis solution 5 used may be an aqueous solution of potassium chloride, sodium chloride, or potassium hydroxide. However, the electrolysis solution 5 is not limited thereto, and conventionally-known electrolysis solutions applied to air cells may be used. The amount of the electrolysis solution 5 is determined in view of, for example, a discharge time of the air cell 1, a precipitation amount of metal salt at the time of discharge, and a flowing amount sufficient to keep a predetermined composition.

The insulation fluid 8 is a liquid or gas having an electric insulation property. Examples of the insulation fluid 8 include insulation oil, silicone oil, hydrofluoroether, air, and arbitrary gas; however, the insulation fluid 8 is not limited to these examples.

According to the assembled battery C1 configured as described above, since the insulation fluid 8 is sealed in the respective connection flow paths 7 by which the storage portions 6 of the respective adjacent air cells 1 communicate with each other, a short circuit due to the electrolysis solution 5 in the respective adjacent air cells 1 can be prevented. In addition, in the assembled battery C1, since the storage portions 6 of the respective adjacent air cells 1 communicate with each other by the respective connection flow paths 7 below the liquid surface of the electrolysis solution 5 of each air cell 1, the electrolysis solution 5 can be injected into the storage portions 6 of the respective air cells 1 from one part of the assembled battery C1. This facilitates a process of injecting the electrolysis solution 5 and ensures a uniform injection amount of the electrolysis solution 5 into the respective storage portions 6. Accordingly, power generation performance of all of the air cells 1 can be equalized.

Second Embodiment

Figure 2A:
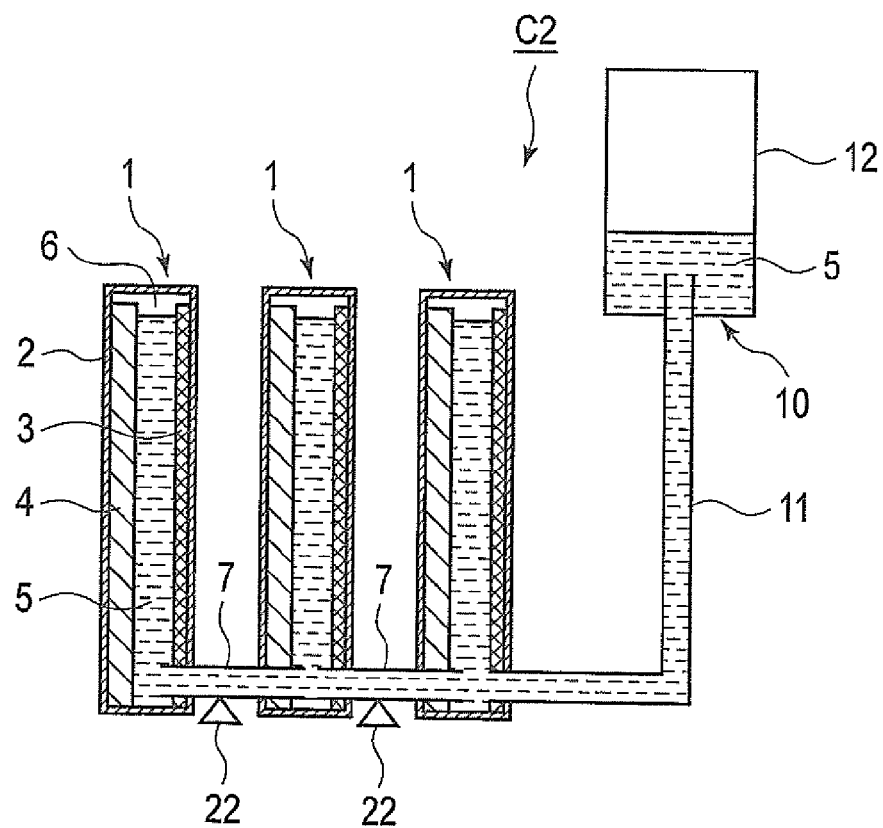
FIG. 2A is a cross-sectional view showing an injected state of an electrolysis solution in an assembled battery according to a second embodiment of the present invention.
Figure 2B:
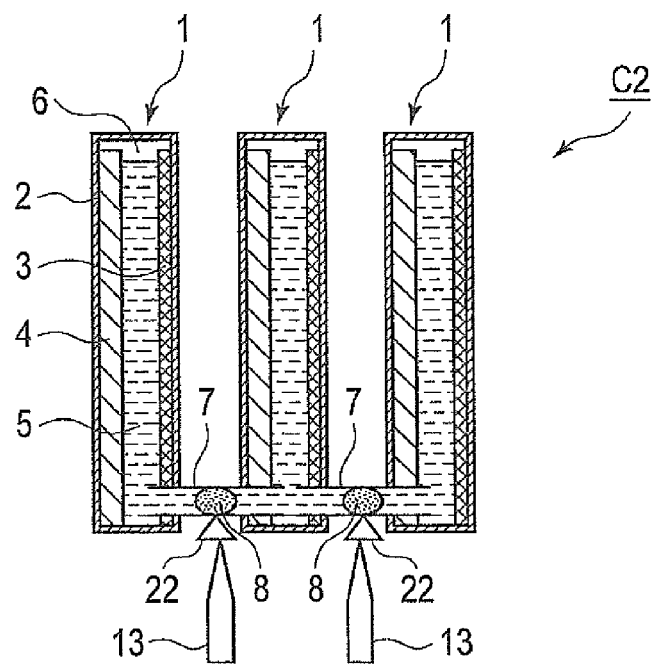
FIG. 2B is a cross-sectional view showing an injected state of an insulation fluid in the assembled battery according to the second embodiment of the present invention.

FIG. 2A and FIG. 2B are cross-sectional views for explaining a configuration of an assembled battery C2 according to a second embodiment. It should be noted that the same elements as those in the first embodiment are indicated by the same reference numerals, and specific explanations thereof are not repeated.

The assembled battery C2 shown in FIG. 2A includes an electrolysis solution supply system 10 which supplies the electrolysis solution 5 to the storage portions 6 of the respective air cells 1, and an electrolysis solution supply passage 11 by which the electrolysis solution supply system 10 communicates with at least one of the storage portions 6 of the air cells 1. In the present embodiment, the electrolysis solution supply passage 11 is connected to the storage portion 6 of the air cell 1 located at the end of the arrangement (on the right side in the figure). The assembled battery C2 further includes injection portions 22 formed in the respective connection flow paths 7 to inject the insulation fluid 8 into the connection flow paths 7.

The electrolysis solution supply system 10 includes an electrolysis solution tank 12 for storing the electrolysis solution 5 and an electrolysis solution pressure-feed means (not shown in the figure) such as a pump. The injection portions 22 of the connection flow paths 7 may each be provided with a check valve by which an inward flow from the external side is only allowed.

As shown in FIG. 2A, according to the assembled battery C2 configured as described above, the electrolysis solution 5 inside the electrolysis solution tank 12 is supplied and injected into the storage portion 6 of the air cell 1 located at the end of the arrangement via the electrolysis solution supply passage 11. As a result, the electrolysis solution 5 can evenly be injected into all of the storage portions 6 of the air cells 1. After the electrolysis solution 5 is injected, the insulation fluid 8 is then injected into each connection flow path 7 from the injection portion 22 with a syringe 13. Accordingly, a short circuit due to the electrolysis solution 5 in the respective air cells 1 adjacent to each other can be prevented.

Here, since the assembled battery C2 is an injection-type battery, a removable connector, for example, may be interposed between the air cell 1 located at the end of the arrangement and the electrolysis solution passage 11 so that the air cells 1 serve as cartridges. In that case, when the assembled battery C2 is used, the air cell 1 at the end of the arrangement and the electrolysis solution supply passage 11 are connected via the connector, and the electrolysis solution 5 and the insulation fluid 8 are sequentially injected into the air cells 1.

First Modified Example

Figure 3:
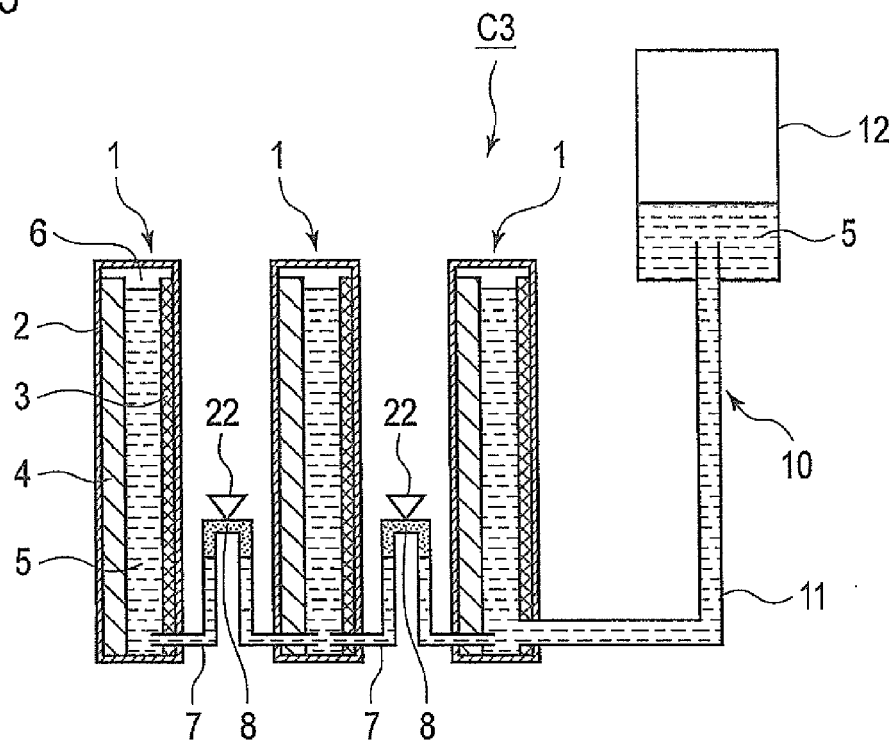
FIG. 3 is a cross-sectional view for explaining a configuration of an assembled battery according to a first modified example of the second embodiment of the present invention.

FIG. 3 shows an assembled battery C3, in which the connection flow paths 7 are each curved upward to be formed into an inverted U-shape, and the insulation fluid 8 has a density lower than that of the electrolysis solution 5. Since the insulation fluid 8 is kept at the upper portion of the respective connection flow paths 7 in the assembled battery C3, a short circuit due to the electrolysis solution 5 in the respective air cells 1 adjacent to each other can be prevented.

Second Modified Example

Figure 4:
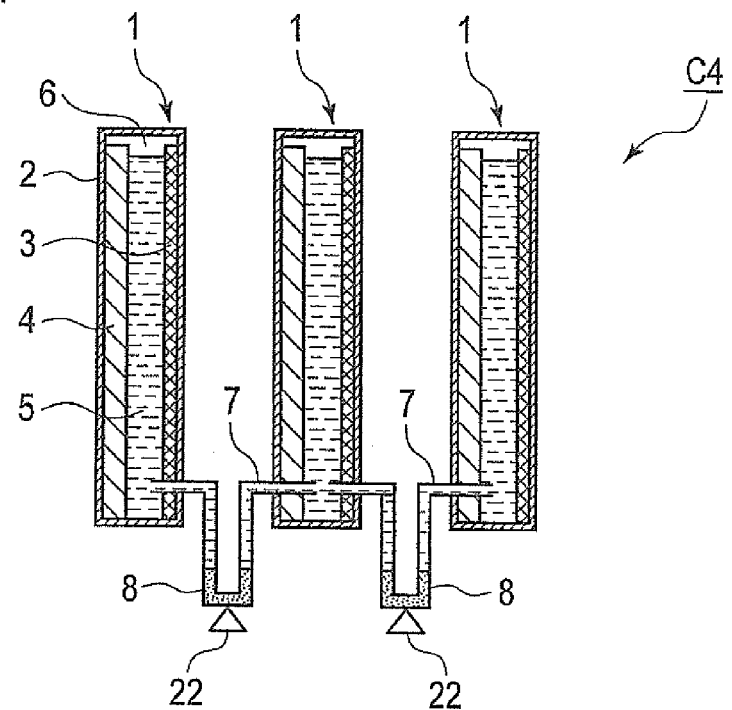
FIG. 4 is a cross-sectional view for explaining a configuration of an assembled battery according to a second modified example of the second embodiment of the present invention.

FIG. 4 shows an assembled battery C4, in which the connection flow paths 7 are each curved downward to be formed into a U-shape, and the insulation fluid 8 has a density higher than that of the electrolysis solution 5. Since the insulation fluid 8 is kept at the lower portion of the respective connection flow paths 7 in the assembled battery C4, a short circuit due to the electrolysis solution 5 in the respective air cells 1 adjacent to each other can be prevented.

Here, when the respective connection flow paths 7 are curved as in the case of the assembled battery C3 or C4 as shown in FIG. 3 or FIG. 4, the connection flow paths 7 may be formed into an M-shape or a W-shape, instead of the inverted U-shape or the U-shape described above, so that the connection flow paths may be provided with branched portions to be connected to the other connection flow paths. Alternatively, a protruded portion or a recess portion may be provided in each of the connection flow paths 7 so as to store and keep the insulation fluid 8 in a fixed position.

Third Embodiment

Figure 5A:
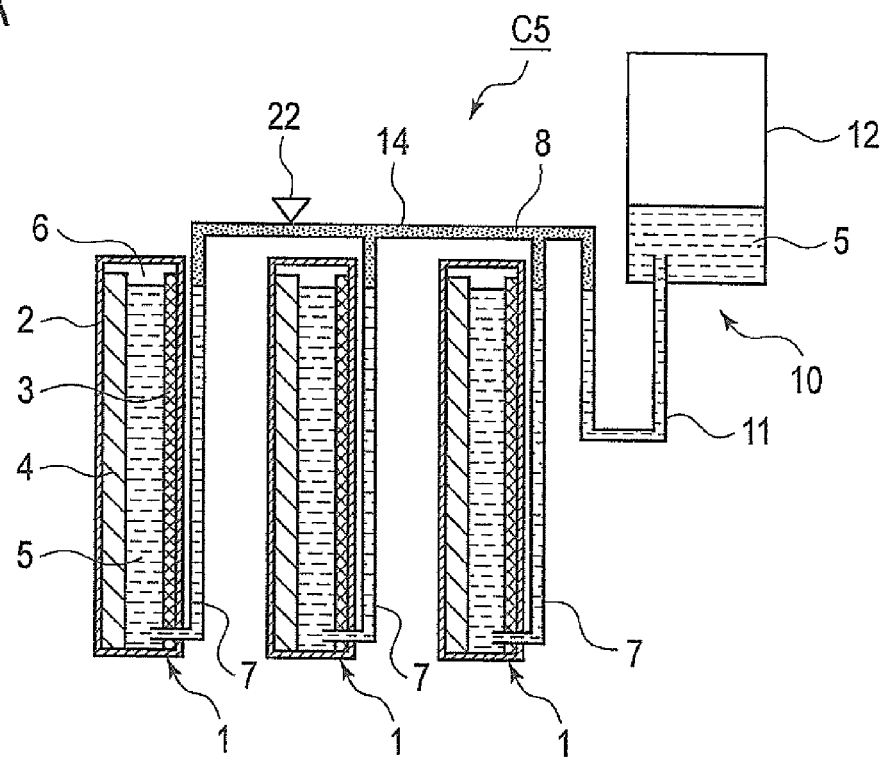
FIG. 5A is a cross-sectional view for explaining a configuration of an assembled battery according to a third embodiment of the present invention.

An assembled battery C5 shown in FIG. 5A includes a branching pipe 14 by which the respective adjacent connection flow paths 7 communicate with each other. The respective connection flow paths 7 and the branching pipe 14 are formed integrally or separately so as to form a connection flow path member. The insulation fluid 8 is sealed in the branching pipe 14. The insulation fluid 8 may be sealed in the branching pipe 14 and further part of the respective connection flow paths 7. The branching pipe 14 is located above the respective air cells 1. The branching pipe 14 is connected with the plural connection flow paths 7 connected to the storage portions 6 of the respective air cells 1. As a result, the storage portions 6 of the respective adjacent air cells 1 communicate with each other by the connection flow paths 7 and the branching pipe 14.

The assembled battery C5 includes the injection portion 22 for injecting the insulation fluid 8 into the branching pipe 14, the electrolysis solution supply system 10, and the electrolysis solution supply passage 11 by which the electrolysis solution supply system 10 communicates with the branching pipe 14.

The assembled battery C5 configured as described above can achieve advantageous effects similar to those in the first and second embodiments. Further, the electrolysis solution 5 is injected concurrently into all of the storage portions 6 of the air cells 1 due to the installation of the branching pipe 14. As a result, the electrolysis solution 5 can evenly be injected into all of the storage portions 6 of the air cells in a short period of time. In addition, the insulation fluid 8 is injected into the assembled battery C5 from the injection portion 22 in the branching pipe 14. Since the branching pipe 14 is located above the respective air cells 1, a liquid or air having a density lower than that of the electrolysis solution 5 may be used as the insulation fluid 8. Accordingly, a short circuit due to the electrolysis solution 5 in the respective air cells 1 adjacent to each other can be prevented.

Further, the electrolysis solution supply system 10 may serve concurrently as a supply system of the insulation fluid 8. In that case, after the electrolysis solution 5 inside the electrolysis solution tank 12 is injected into all of the storage portions 6 of the air cells 1 via the branching pipe 14 and the plural connection flow paths 7, the insulation fluid 8 is then injected into the branching pipe 14 from the electrolysis solution supply passage 11. As a result, the injection portion 22 in the branching pipe 14 can be omitted.

Figure 5B:
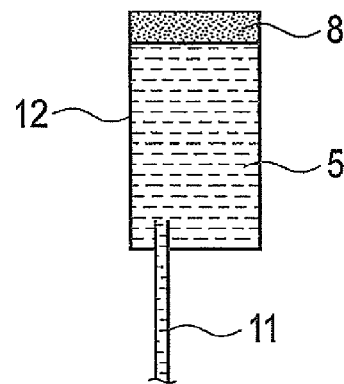
FIG. 5B is a cross-sectional view showing an electrolysis solution tank in the assembled battery according to the third embodiment of the present invention.

Further, when the assembled battery C5 uses, as the insulation fluid 8, a liquid having a density lower than that of the electrolysis solution 5, both the electrolysis solution 5 and the insulation fluid 8 can be stored in the electrolysis solution tank 12 in a separated state, as shown in FIG. 5B. In that case, the amount of each of the electrolysis solution 5 and the insulation fluid 8 is determined depending on the volume of each air cell 1 and each passage. Since the electrolysis solution 5 and the insulation fluid 8 are sequentially injected, the electrolysis solution 5 and the insulation fluid 8 can be injected in a short period of time. Accordingly, a short circuit due to the electrolysis solution 5 in the respective air cells 1 adjacent to each other can be prevented.

First Modified Example

Figure 6:
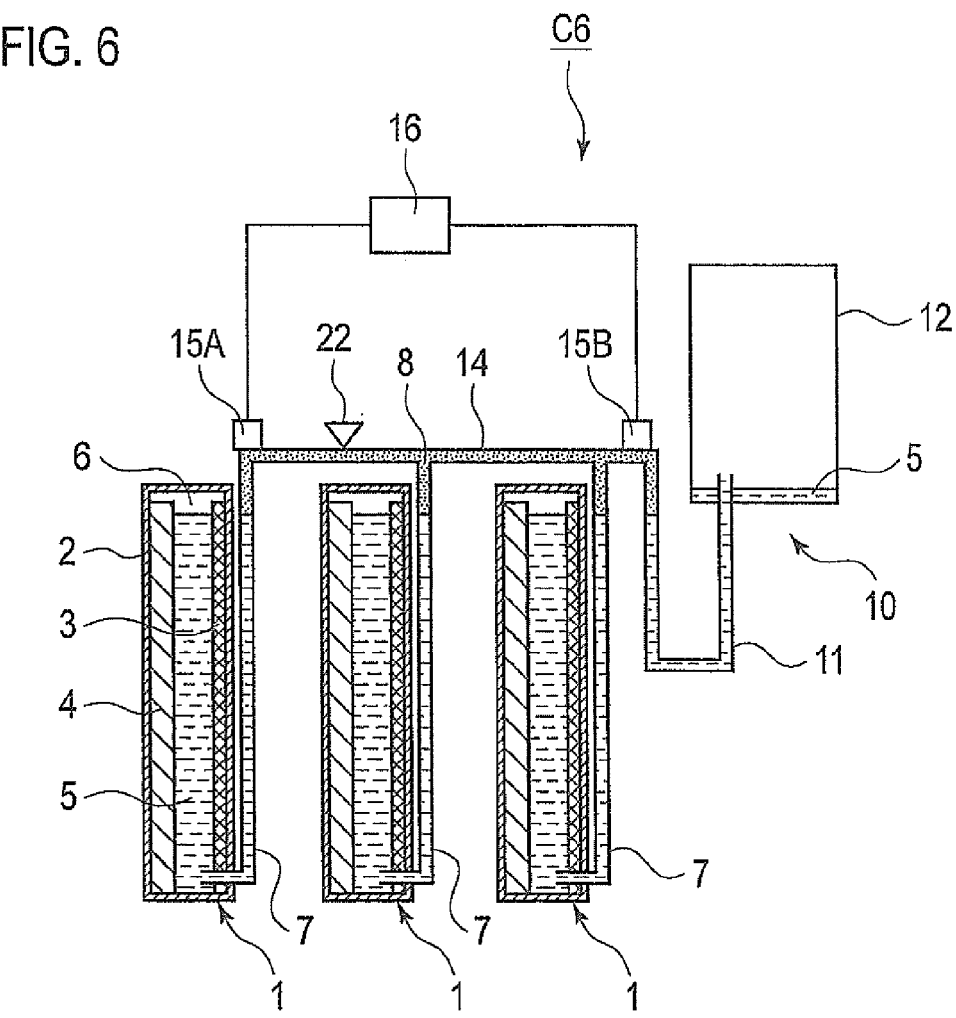
FIG. 6 is a cross-sectional view for explaining a configuration of an assembled battery according to a first modified example of the third embodiment of the present invention.

An assembled battery C6 shown in FIG. 6 has a configuration similar to that of the assembled battery C5 shown in FIG. 5A, and further includes external electrodes 15A, 15B for electrolyzing the injected electrolysis solution 5 and a power source 16. The external electrodes 15A, 15B are attached to the branching pipe 14.

When the electrolysis solution 5 is injected into the storage portions 6 of the respective air cells 1 in the assembled battery C6, the branching pipe 14 is also filled with the electrolysis solution 5, and current is then applied thereto by the external electrodes 15A, 15B so as to electrolyze the electrolysis solution 5 in the branching pipe 14. The electrolyzation of the electrolysis solution 5 changes gas produced in the branching pipe 14 into the insulation fluid 8.

According to the assembled battery C6 configured as described above, there is no need to preliminarily prepare the insulation fluid, and the insulation fluid 8 can surely be sealed inside the branching pipe 14. Accordingly, a short circuit due to the electrolysis solution 5 in the respective air cells 1 adjacent to each other can be prevented.

Second Modified Example

Figure 7:
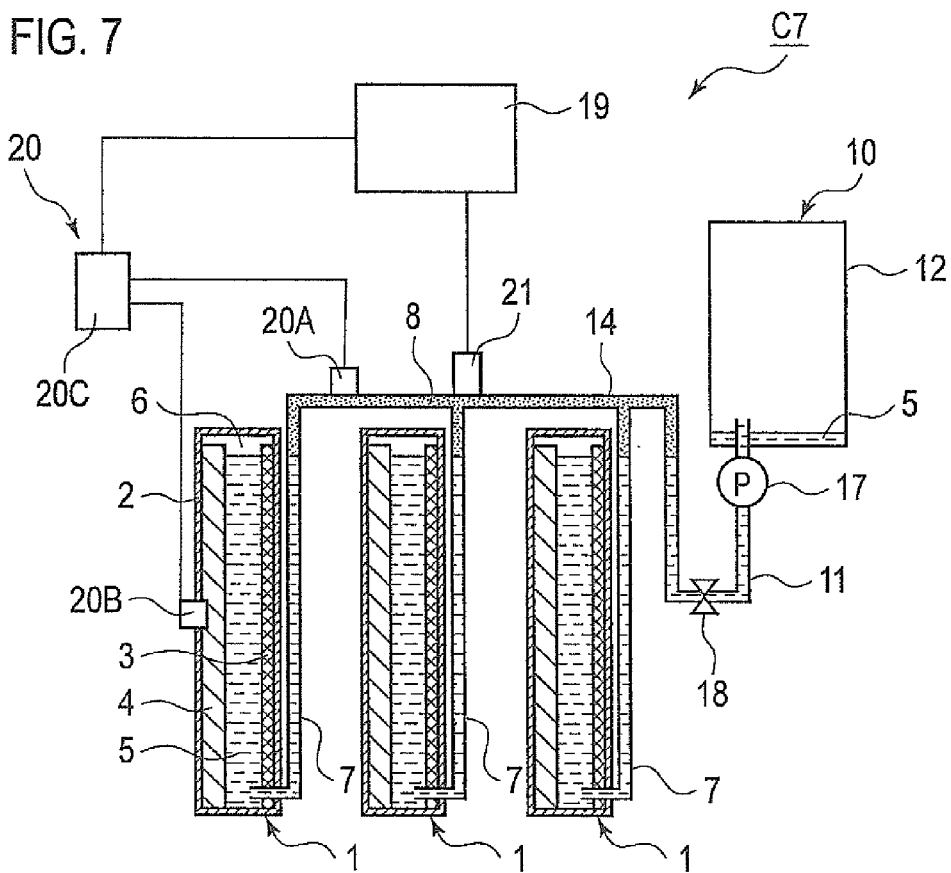
FIG. 7 is a cross-sectional view for explaining a configuration of an assembled battery according to a second modified example of the third embodiment of the present invention.

An assembled battery C7 shown in FIG. 7 has a configuration similar to that of the assembled battery C5 shown in FIG. 5A, and further has a configuration in which the electrolysis solution supply system 10 includes the electrolysis solution tank 12, the electrolysis solution supply passage 11, a pump 17 installed in a middle part of the electrolysis solution supply passage 11, and a switching valve 18 installed on the downstream side of the pump 17.

The assembled battery C7 further includes a supply control unit 19 which controls the operation of the electrolysis solution supply system 10, an insulation detection unit 20 which detects an insulation state due to the insulation fluid 8 sealed in the branching pipe 14, and an inclination detection unit 21 which detects an inclination state of the assembled battery C7. Here, in the present embodiment, the insulation fluid 8 is sealed in the branching pipe 14.

The supply control unit 19 controls the operation of each of the pump 17 and the switching valve 18 in the electrolysis solution supply system 10. The supply control unit 19 functions to supply the insulation fluid 8 when the detection result by the insulation detection unit 20 is unacceptable, and functions to stop the supply of the electrolysis solution 5 when the degree of the inclination detected by the inclination detection unit 21 is a predetermined value or greater.

The insulation detection unit 20 includes an electrode 20A attached to the branching pipe 14, another electrode 20B attached to the air cell 1 located at the end of the arrangement (on the left side in the figure) on the metal negative electrode 4 side, and a detector 20C. The insulation detection unit 20 inputs a signal from the detector 20C into the supply control unit 19. The inclination detection unit 21 is, for example, a well-known inclination sensor which inputs a detected value into the supply control unit 19.

The supply control unit 19 opens the switching valve 18 to inject the electrolysis solution 5 into the storage portions 6 of the respective air cells 1. Since one end of the electrolysis solution supply passage 11 is in an open state in the electrolysis solution tank 12 once the injection of the electrolysis solution 5 is completed, the supply control unit 19 operates the pump 17 to introduce air into the electrolysis solution supply passage 11. Namely, the supply control unit 19 injects air as an insulation fluid into the branching pipe 14. Thereafter, the supply control unit 19 stops the pump 17 and closes the switching valve 18 so that the insulation fluid 8 is sealed in the branching pipe 14.

According to the assembled battery C7 configured as described above, there is no need to preliminarily prepare the insulation fluid, and the air can be injected as the insulation fluid 8 into the branching pipe 14 immediately after the electrolysis solution 5 is injected. Accordingly, a short circuit due to the electrolysis solution 5 in the respective air cells 1 adjacent to each other can be prevented.

Further, in the assembled battery C7, the control processing is carried out by the supply control unit 19, in addition to the injection of the electrolysis solution 5. If the insulation state detected by the insulation detection unit 20 is unacceptable, the supply control unit 19 determines that the insulation fluid 8 is not supplied sufficiently to the branching pipe 14 and thus supplies the insulation fluid 8 by operating the pump 17. In addition, when the degree of the inclination detected by the inclination detection unit 21 is a predetermined value or greater, the supply control unit 19 closes the switching valve 18 to stop supplying the electrolysis solution 5 because the electrolysis solution 5 is unevenly injected into the respective storage portions 6 of the air cells 1 due to the large inclination of the assembled battery C7.

As described above, the assembled battery C7 including the supply control unit 19, the insulation detection unit 20 and the inclination detection unit 21, can automatically regulate the injected state of each of the electrolysis solution 5 and the insulation fluid 8 so as to surely inject an appropriate amount thereof. Further, the assembled battery C7 stops the supply of the electrolysis solution 5 when the inclination is large, so as to prevent power generation from being started if the electrolysis solution 5 is not supplied appropriately to the respective air cells 1.

Here, in the configuration in which the insulation fluid 8 is sealed in the branching pipe 14 as in the case of the assembled batteries C5, C6 and C7 shown in FIG. 5A to FIG. 7, the branching pipe 14 may be placed below the liquid surface of the electrolysis solution 5 in the respective air cells 1, for example, in a region between the liquid surface and the middle portion of the respective air cells 1.

Fourth Embodiment

FIG. 8A to 9C each show an assembled battery C8 in which each air cell 1 includes an exterior plate 25 on the periphery thereof. Note that FIG. 8A to FIG. 9C show the storage portion 6 on the surface of the air cell 1 while omitting the positive electrode 3 in order to simply explain the injected state of the electrolysis solution 5 or the insulation fluid 8.

The exterior plate 25 may be placed on at least part of the periphery of the air cell 1. The exterior plate 25 preferably has a fixed thickness in the main body portion; however, the shape of the exterior plate 25 may be varied. The material of the exterior plate 25 is not particularly limited. For example, when the exterior plate 25 is made of plastic, the casing 2 and the exterior plate 25 of the air cell 1 can be integrally formed so as to easily mass-produce the assembled batteries C8. In addition, when the plural air cells 1 are arranged so as to form the assembled battery C8, the exterior plates 25 adjacent to and in contact with each other may be provided with external terminals or the like.

Figure 8A:
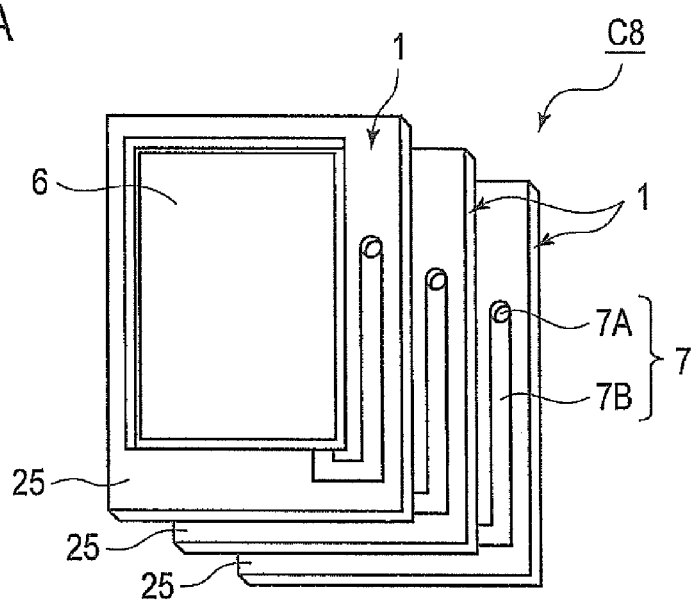
FIG. 8A is a perspective view showing an assembled battery in an exploded state for explaining a configuration of the assembled battery according to a fourth embodiment of the present invention.
Figure 8B:
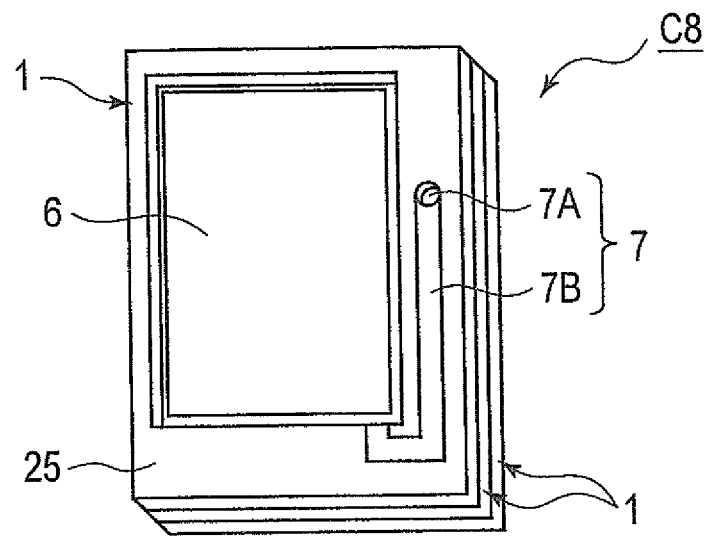
FIG. 8B is a perspective view showing the assembled battery in an assembled state according to the fourth embodiment of the present invention.

As shown in the assembled battery C8 of FIG. 8A, the exterior plates 25 of the air cells 1 adjacent to each other are integrated with the connection flow paths 7 communicating with each other when the air cells 1 are connected together. The connection flow paths 7 each include a penetration hole 7A formed in the thickness direction of the exterior plate 25, and a main flow path 7B extending downward from the penetration hole 7A and then turning to reach the lower portion of the storage portion 6. As shown in FIG. 8B, when the air cells 1 adjacent to each other are connected together, the adjacent penetration holes 7A of the exterior plates 25 communicate with each other by seal members (not shown in the figure) so that the connection flow paths 7 of the exterior plates 25 communicate with each other.

Figure 9A:
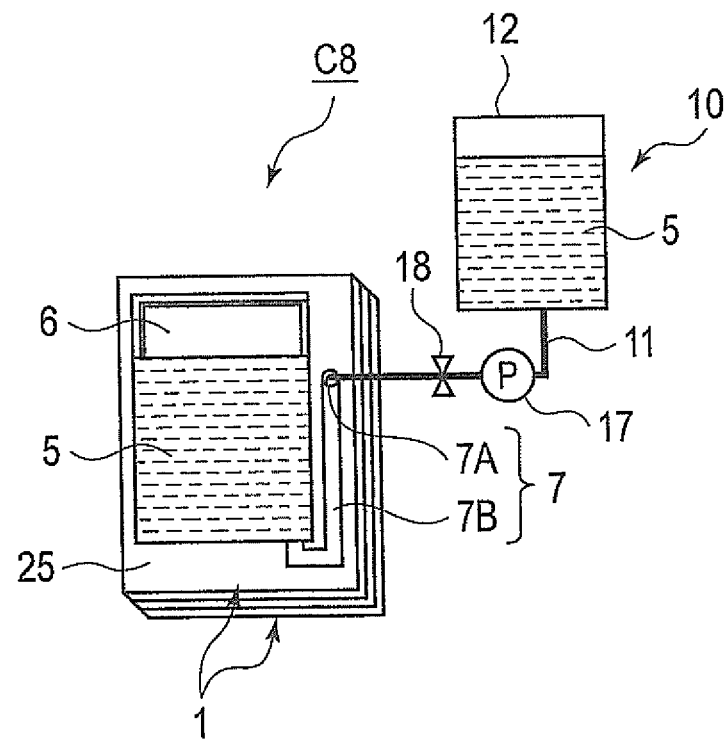
FIG. 9A is a perspective view showing an injected state of an electrolysis solution in the assembled battery shown in FIG. 8B.

In the assembled battery C8, the electrolysis solution supply system 10 shown in FIG. 9A supplies the electrolysis solution 5 to the storage portions 6 of the respective air cells 1 as in the case of, for example, the assembled battery C7 shown in FIG. 7. Namely, in the assembled battery C8, the electrolysis solution supply passage 11 of the electrolysis solution supply system 10 is connected to the penetration hole 7A of the connection flow path 7 in the air cell 1 located at the end of the arrangement so as to inject the electrolysis solution 5 into the storage portions 6 of the respective air cells 1 via the respective connection flow paths 7.

Figure 9B:
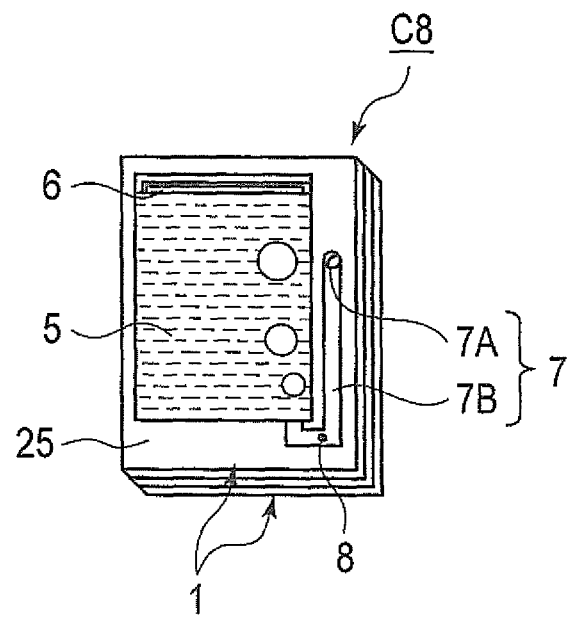
FIG. 9B is a perspective view showing an injected state of an insulation fluid in the assembled battery shown in FIG. 8B.

After the electrolysis solution 5 is injected, the insulation fluid 8 is then injected from the connection flow paths 7 as shown in FIG. 9B. The insulation fluid 8 in the present embodiment is air. Although the insulation fluid 8 may excessively enter the storage portions 6 as bubbles when being injected, the excessive insulation fluid 8 is discharged to the outside through the air-permeable positive electrodes 3.

Figure 9C:
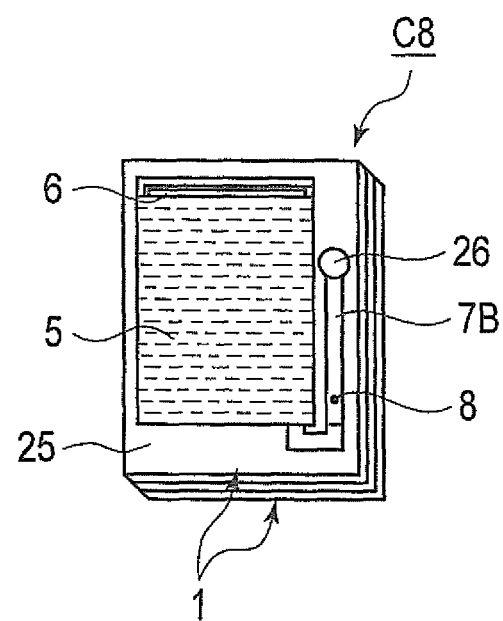
FIG. 9C is a perspective view showing a state where the injection of the electrolysis solution and the insulation fluid is completed in the assembled battery shown in FIG. 8B.

In the assembled battery C8, as shown in FIG. 9C, after the insulation fluid 8 is sealed in the penetration holes 7A and the main flow paths 7B of the connection flow paths 7, the penetration hole 7A in the air cell 1 located at the end of the arrangement is sealed with a cap 26 to complete the injection of the electrolysis solution 5 and the insulation fluid 8.

The assembled battery C8 configured as described above can achieve advantageous effects similar to those in the first to third embodiments, easily handle the air cells 1, and ensure a common flow passage of the electrolysis solution 5 and the insulation fluid 8 only by connecting the air cells 1 adjacent to each other. This facilitates the process of injecting the electrolysis solution 7 and the insulation fluid 8. In addition, since the exterior plates 25 having the connection flow paths 7 can be mass-produced, a reduction in cost of the assembled batteries can be achieved.

Further, since the air cells 1 adjacent to each other are directly connected together, the assembled battery C8 has a simple structure and thus decreases the arrangement pitches of the air cells 1 adjacent to each other so as to achieve a reduction in size and weight. In addition, the assembled battery C8 can freely increase or decrease the number of the air cells 1 so as to easily deal with a reduction in size and weight and an increase in capacity of the assembled battery.

Further, the assembled battery C8 can easily separate the air cells 1 from the electrolysis solution supply system 10 and thus use the air cells 1 as cartridges. In that case, a predetermined number of the air cells 1 may be used as a cartridge unit, and the plural units of the cartridges may be connected together.

The assembled batteries C1 to C8 explained in the first to fourth embodiments can prevent a short cut due to the electrolysis solution 5 in the respective air cells 1 adjacent to each other and equalize the amount of the electrolysis solution 5 injected in each of the air cells 1 so as to ensure stabilized power generation performance. Further, the supply passage of the electrolysis solution 5 or the insulation fluid 8 has a simple structure so as to easily inject the electrolysis solution 5 or the insulation fluid 8. Accordingly, the assembled batteries C1 to C8 can be suitably used for a main power supply or an auxiliary power supply in a moving body such as an automobile. The assembled battery C8 including the plural air cells 1 having the exterior plates 25 especially, in addition to the effects described above, can easily handle the air cells 1, increase or decrease the number of the air cells 1, mass-produce the exterior plates 25 and use the air cells 1 as cartridges. Thus, the assembled battery C8 is particularly suitably used for a power supply mounted on a vehicle.

The assembled battery of the present invention is not limited to the embodiments described above, and modifications of the shape, number and material of each element can be made as appropriate without departing from the scope of the present invention.

The invention claimed is:

1. An assembled battery comprising:
   two or more air cells arranged in a horizontal direction, each air cell including a storage portion between a positive electrode and a metal negative electrode to store an electrolysis solution without circulating the electrolysis solution; and
   a connection flow path member including one or more connection flow paths by which the storage portions of the respective adjacent air cells communicate with each other,
   wherein an insulation fluid for electrically insulating the electrolysis solution in the respective adjacent air cells is sealed in the connection flow path member.

2. The assembled battery according to claim 1, wherein the insulation fluid is sealed in each of the connection flow paths.

3. The assembled battery according to claim 2, wherein the storage portions of the respective adjacent air cells communicate with each other by the respective connection flow paths below a liquid surface of the electrolysis solution stored in each of the storage portions.

4. The assembled battery according to claim 2, further comprising an electrolysis solution supply system configured to supply the electrolysis solution to the respective air cells, the electrolysis solution supply system including an electrolysis solution supply passage by which the electrolysis solution supply system communicates with at least one of the storage portions of the air cells.

5. The assembled battery according to claim 2, wherein each connection flow path includes an injection portion from which the insulation fluid is injected.

6. The assembled battery according to claim 2, wherein each connection flow path is curved upward, and
   the insulation fluid is a fluid having a density lower than that of the electrolysis solution.

7. The assembled battery according to claim 2, wherein each connection flow path is curved downward, and
   the insulation fluid is a fluid having a density higher than that of the electrolysis solution.

8. The assembled battery according to claim 1, wherein two or more of the connection flow paths are formed,
   the connection flow path member further includes a branching pipe by which the two or more connection flow paths communicate with each other, and
   the insulation fluid is sealed in the branching pipe.

9. The assembled battery according to claim 8, further comprising an electrolysis solution supply system configured to supply the electrolysis solution to the respective air cells, the electrolysis solution supply system including an electrolysis solution supply passage by which the electrolysis solution supply system communicates with the branching pipe.

10. The assembled battery according to claim 9, wherein the electrolysis solution supply system concurrently serves as a supply system of the insulation fluid.

11. The assembled battery according to claim 8, wherein the branching pipe includes an external electrode to electrolyze the electrolysis solution in the branching pipe.

12. The assembled battery according to claim 10, further comprising:
- a supply control unit configured to control an operation of the electrolysis solution supply system; and
- an insulation detection unit configured to detect an insulation state due to the insulation fluid sealed in the branching pipe,
- wherein the supply control unit supplies the insulation fluid when a result detected by the insulation detection unit is unacceptable.

13. The assembled battery according to claim 9, further comprising:
- a supply control unit configured to control an operation of the electrolysis solution supply system; and
- an inclination detection unit configured to detect an inclination state of the assembled battery,
- wherein the supply control unit stops supplying the electrolysis solution when an inclination detected by the inclination detection unit is a predetermined value or greater.

14. The assembled battery according to claim 1, wherein each air cell includes an exterior plate on a periphery thereof, and
the respective exterior plates are integrated with the respective connection flow paths, and in a state where the air cells adjacent to each other are connected together, the connection flow path formed on the exterior plate of one air cell communicates with the connection flow path formed on the exterior plate of another air cell.

* * * * *